(12) United States Patent
Castagna et al.

(10) Patent No.: US 9,969,123 B2
(45) Date of Patent: May 15, 2018

(54) METHOD AND DEVICE FOR APPLYING AT LEAST ONE DECORATIVE STRIP TO A SEAT COVER

(71) Applicant: JOHNSON CONTROLS GMBH, Burscheid (DE)

(72) Inventors: Francesco Castagna, Havre (BE); Niels Mondelaers, Laakdal (BE); Michaela Rihová, Strakonice (CZ)

(73) Assignee: JOHNSON CONTROLS GMBH, Burscheid (DE)

( * ) Notice: Subject to any disclaimer, the term of this patent is extended or adjusted under 35 U.S.C. 154(b) by 366 days.

(21) Appl. No.: 14/891,469

(22) PCT Filed: May 15, 2014

(86) PCT No.: PCT/EP2014/001310
§ 371 (c)(1),
(2) Date: Nov. 16, 2015

(87) PCT Pub. No.: WO2014/183875
PCT Pub. Date: Nov. 20, 2014

(65) Prior Publication Data
US 2016/0082648 A1   Mar. 24, 2016

(30) Foreign Application Priority Data

May 15, 2013   (DE) .................. 10 2013 008 293

(51) Int. Cl.
| | | |
|---|---|---|
| B29C 65/04 | (2006.01) | |
| B29C 65/00 | (2006.01) | |
| B44C 1/18 | (2006.01) | |
| B29L 31/58 | (2006.01) | |
| B29L 31/00 | (2006.01) | |
| B29K 101/00 | (2006.01) | |

(52) U.S. Cl.
CPC .......... *B29C 65/04* (2013.01); *B29C 66/1122* (2013.01); *B29C 66/232* (2013.01);
(Continued)

(58) Field of Classification Search
CPC ... B29C 65/04; B29C 66/1122; B29C 66/232; B29C 66/301; B29C 66/4722;
(Continued)

(56) References Cited

U.S. PATENT DOCUMENTS 3,060,653 A   10/1962   Flax
4,663,211 A   5/1987   Kon

FOREIGN PATENT DOCUMENTS

AT   241 101 B   7/1965
DE   29 35 356 A1   3/1981
(Continued)

OTHER PUBLICATIONS

Japanese Office Action dated Sep. 20, 2016 (with English translation).

*Primary Examiner* — Daniel McNally
(74) *Attorney, Agent, or Firm* — McGlew and Tuttle, P.C.

(57) ABSTRACT

A device for applying a decorative strips (3, 4, 5, 6) with positional accuracy to a seat cover (2) with high-frequency welding, includes two tool halves (10, 30), of which one tool half has at least one electrode (14, 15, 16, 17). A first tool half (10) has at least two electrodes (14, 15, 16, 17) oriented parallel to each other, the width of the electrodes being adapted to the width of the decorative strips (3, 4, 5, 6) to be applied. Insulators (18, 19, 20, 21, 22) oriented in parallel are arranged between the electrodes (14, 15, 16, 17) and in parallel on the outside of the electrodes. The insulators (18, 19, 20, 21, 22) protrude beyond the electrodes (14, 15, 16, 17) in the direction of the second tool half (30). The insulators (18, 19, 20, 21, 22) are height-adjustable relative to the electrodes (14, 15, 16, 17).

13 Claims, 5 Drawing Sheets

(52) U.S. Cl.
CPC ........ *B29C 66/301* (2013.01); *B29C 66/4722* (2013.01); *B29C 66/8161* (2013.01); *B29C 66/81262* (2013.01); *B29C 66/81263* (2013.01); *B29C 66/81435* (2013.01); *B29C 66/84* (2013.01); *B29C 66/8432* (2013.01); *B29C 66/92655* (2013.01); *B44C 1/18* (2013.01); *B29C 66/305* (2013.01); *B29C 66/7294* (2013.01); *B29C 66/8187* (2013.01); *B29C 66/81821* (2013.01); *B29C 66/8242* (2013.01); *B29C 66/8322* (2013.01); *B29K 2101/00* (2013.01); *B29L 2031/58* (2013.01); *B29L 2031/771* (2013.01)

(58) Field of Classification Search
CPC ........ B29C 66/81262; B29C 66/81263; B29C 66/81435; B29C 66/816; B29C 66/8161; B29C 66/84; B29C 66/8434; B29C 66/92655
See application file for complete search history.

(56) References Cited

FOREIGN PATENT DOCUMENTS

| | | |
|---|---|---|
| DE | 36 12 025 C2 | 9/1988 |
| FR | 2 534 793 A1 | 4/1984 |
| GB | 954282 A | 4/1964 |
| GB | 2 278 082 A | 11/1994 |
| JP | S56-113409 A | 9/1981 |
| JP | S61-244391 A | 10/1986 |
| JP | S62-273831 A | 11/1987 |
| JP | S62-284728 A | 12/1987 |
| JP | 2000 237280 A | 9/2000 |
| JP | 2001-314271 A | 11/2001 |

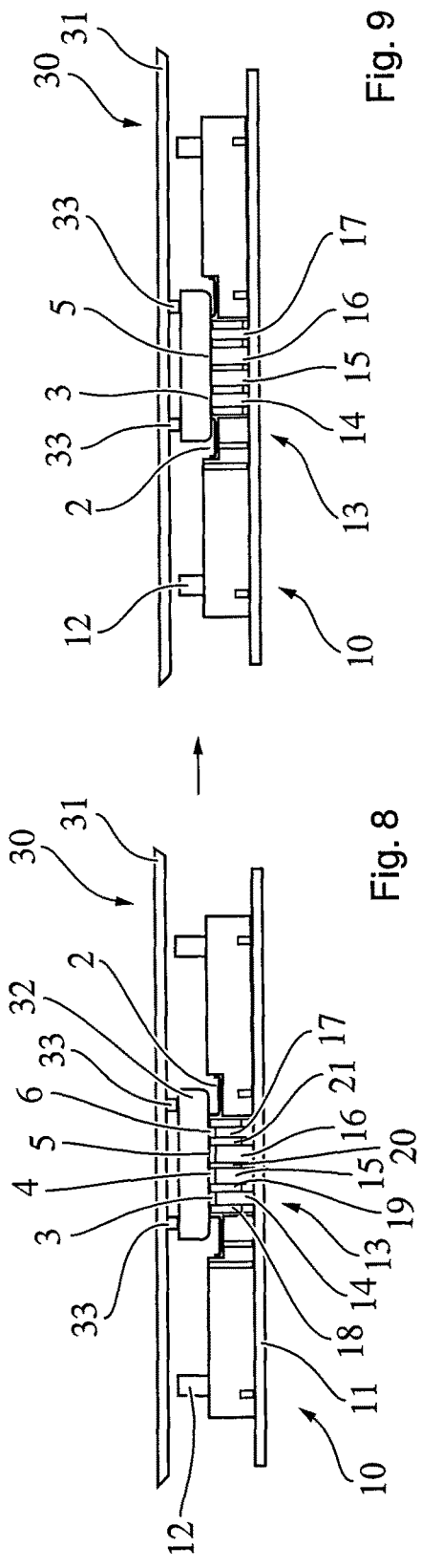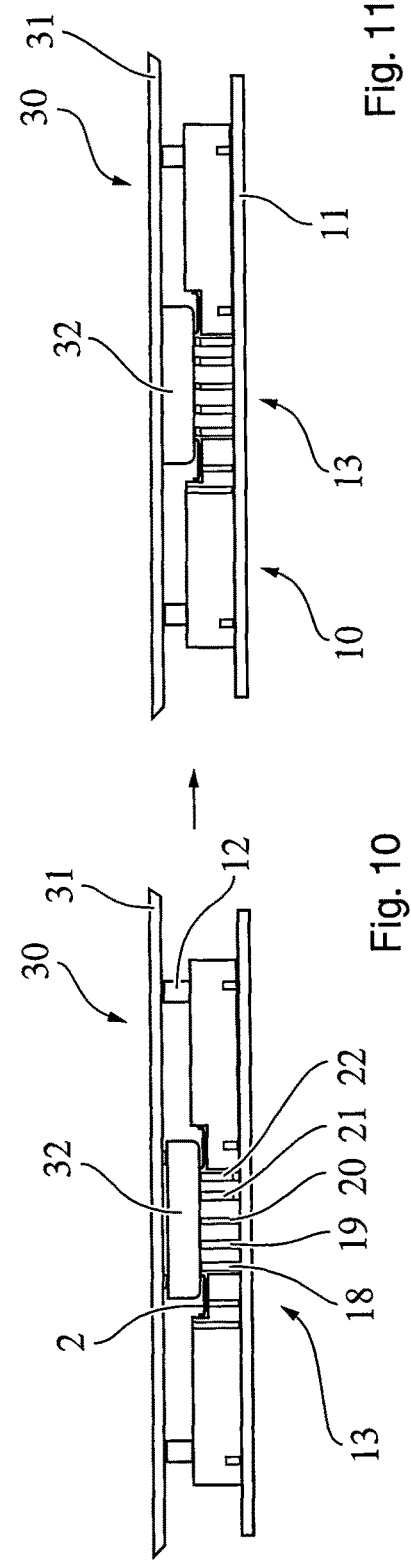

METHOD AND DEVICE FOR APPLYING AT LEAST ONE DECORATIVE STRIP TO A SEAT COVER

CROSS REFERENCE TO RELATED APPLICATIONS

This application is a United States National Phase Application of International Application PCT/EP2014/001310 filed May 15, 2014 and claims the benefit of priority under 35 U.S.C. § 119 of German Patent Application 10 2013 008 293.5 filed May 15, 2013 the entire contents of which are incorporated herein by reference.

FIELD OF THE INVENTION

The invention relates to a method and a device for applying at least one decorative strip to a seat cover by means of high-frequency welding, comprising two tool halves, at least one of which has an electrode.

BACKGROUND OF THE INVENTION

It is known to apply decorative strips or other patterns to seat covers, in particular textile seat covers and also to car seats by means of the high-frequency welding.

A device of the above-mentioned type is known from DE 36 12 025 C2. In this document, a U-shaped decorative strip is placed into a guide groove. The guide groove is held by a molded part and is brought close to the seat cover. The electrode, which pushes the decorative strip in the guide part against the seat cover, is then pushed into the guide part from below.

The exact adjustment in particular in the case of a plurality of decorative strips, which run parallel, is only possible with a comparatively high effort.

SUMMARY OF THE INVENTION

The invention is based on an object of creating a method and a device of the above-mentioned type, by means of which a plurality of decorative strips can be applied to a seat cover with positional accuracy.

In a method for applying at least one decorative strip to a seat cover by means of high-frequency welding, provision is made for decorative strips to be placed into a tool half comprising electrodes, which are oriented parallel to each other and insulators, which separate the electrodes and which are oriented in parallel, for a seat cover to be placed onto the first tool half comprising the decorative strips, which are inserted parallel to each other, for a second tool half to be placed onto the seat cover, for a high-frequency alternating voltage to be applied between the electrodes of the first tool half and the second tool half, so that the decorative strips are welded to the seat cover, for the first tool half and the second tool half to be pressed against each other by means of a pressure during the high-frequency welding, and for the insulators, which protrude beyond the electrodes at the beginning of the process, to be pushed downwards when being compressed, so that the height difference between the insulators and the electrodes becomes smaller. It is possible through this to adjust decorative strips exactly and to weld them onto seat covers parallel to each other.

The tool halves are compressed under pressure during the high-frequency welding. Preferably, this takes place by means of a hydraulic press. A compressive force of between 15 and 20 kilonewtons is preferably exerted thereby.

At the beginning of the process, the insulators protrude relative to the electrodes, so that the decorative strips can be inserted between the insulators. The insulators are embodied so as to be height-adjustable and are pushed downwards during the process.

Preferably, the insulators are pushed downwards to the extent that the surfaces of the insulators and of the electrodes form a common area of plane at the end of the process.

In an alternative preferred embodiment, the insulators are lowered to the extent that the electrodes comprising the decorative strips placed thereon protrude beyond the insulators at the end of the process.

The shifting of the insulators can be reached either by means of spring elements, which are arranged below the insulators. In this case, the insulators would be shifted downwards essentially passively. This is effected by bringing together the two tool halves. In the alternative, it is also possible to actively lower the insulators, for example by means of hydraulic or pneumatic elements.

In a further preferred embodiment of the invention, provision is made either on the first tool half or on the second tool half for stops, by means of which the tool halves are brought together up to the strop and thus up to a defined approach.

In the case of a device for applying at least one decorative strip to a seat cover by means of high-frequency welding comprising two tool halves, at least one of which has an electrode, provision is made in a manner, which is essential for the invention, for a first tool half to have at least two electrodes, which are oriented parallel to each other and the widths of which are adapted to the width of the decorative strips, which are to be applied, for insulators, which are oriented in parallel, to be arranged between the electrodes and parallel on the outsides of the electrodes and for the insulators to protrude beyond the electrodes in the direction of the second tool half. The decorative strips, which are to be applied can thus be placed immediately onto the electrodes and are held and guided securely at that location. A highly accurate placement and parallel orientation of decorative strips is possible through this. There are thus n+1 insulators for n electrodes. Preferably, the device serves to carry out the method described above.

Preferably, the insulators are embodied so as to be height-adjustable relative to the electrodes. Particularly preferably, the height-adjustability is embodied in such a manner that the insulators, which initially protrude relative to the electrodes in the direction of the second workpiece, can be shifted until the electrodes and the insulators form a common plane on the upper side thereof.

In a preferred embodiment, all electrodes have the same height. Likewise, all insulators preferably have the same height. A uniform and secure application of the decorative strips to the seat cover is attained through this. In another preferred embodiment of the invention, provision is made for four electrodes. Four parallel decorative strips can thus be applied therewith. Preferably, the two middle electrodes are wider than the two outer electrodes. Preferably, the two middle electrodes are wider than the outer electrodes at a ratio of 3:2. In a preferred embodiment of the invention, the distance between two middle electrodes is smaller than the distance between a middle and an outer electrode. Particularly dynamic optical effects can be achieved through this. This is achieved by means of a corresponding design of the width of the insulators between the electrodes. Advantageously, the electrodes are embodied in a rod-like manner.

Preferably, the individual electrodes are then conductively connected to each other, so that the application of the high-frequency voltage to the individual electrodes is particularly simple, namely only needs to essentially be applied at one location, because the electrodes are conductively connected to each other. Preferably the insulators are also embodied in a rod-like manner. In the case of such an embodiment, the electrodes and insulators can be connected to each other in a simple and easily releasable manner. In particular, screw or clamp connections can be made, by means of which electrodes and insulators are brought into contact with each other, depending on the desired pattern.

In another preferred embodiment, the second tool half has an increased surface area, which corresponds to the area, which is formed by the electrodes and insulators on the first tool half. The two tool halves can be brought together in this manner.

In a particularly preferred embodiment, the increased surface area is movable relative to the remaining second tool half, in particular a plate of the second tool half, but with a prestress. For example, this increased surface area can be connected to the plate of the second tool half by means of a plurality of springs, in particular pressure springs. This has the effect that the second tool half already rests on the first tool half, in particular the insulators, which initially stand up, from the beginning and that the pressure is then increased continuously when being pushing together via the pressure springs. Preferably, the elevated surface area then bears directly on the plate in the last stage of pressing, that is, the pressure springs are then pushed together completely.

The invention will be explained in more detail below by means of an exemplary embodiment, which is illustrated in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 8 is a cross section through the tool in one of different consecutive process stages;

FIG. 9 is a cross section through the tool in another of different consecutive process stages;

FIG. 10 is a cross section through the tool in another of different consecutive process stages; and FIG. 11 is a cross section through the tool in another of different consecutive process stages.

DESCRIPTION OF THE PREFERRED EMBODIMENTS

Figure 1:
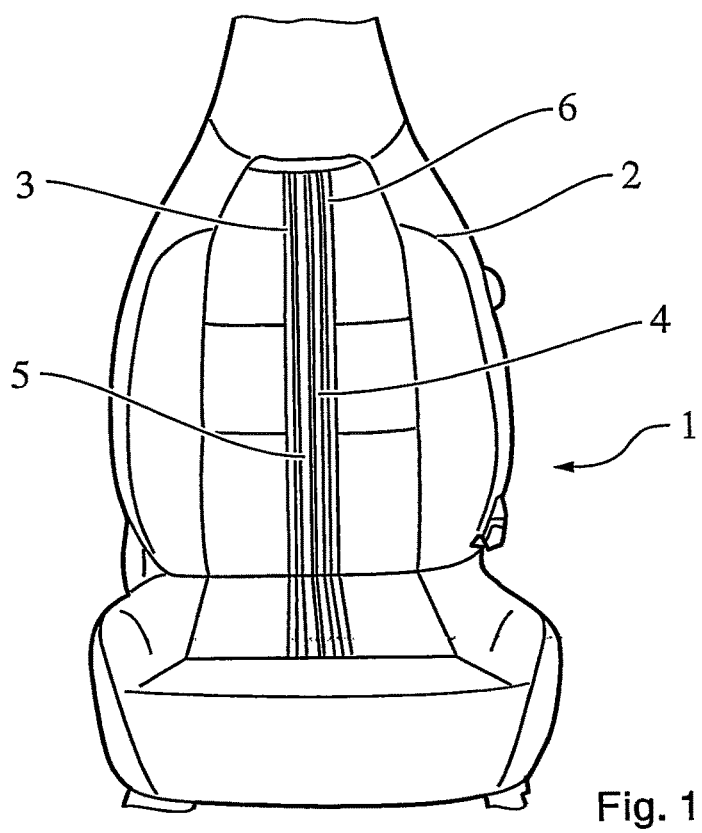
FIG. 1 is a perspective view of a car seat.

FIG. 1 illustrates a car seat 1 comprising a seat cover 2, to which decorative strips 3, 4, 5 and 6 are applied. The decorative strips 3 to 6 are preferably made of a microfiber material. The two middle decorative strips 4 and 5 are thereby wider than the two outer decorative strips 3 and 6 by a factor of 1.5. The distance between the two middle decorative strips 3 and 4 is significantly smaller than the distance between the middle and the outer decorative strips 4, 5 or 3, 6, respectively, thus for example between the decorative strips 5 and 6. The decorative strips 3 to 6 run parallel to each other across the entire seat cover 2. The decorative strips 3 to 6 extend across the backrest as well as across the lower actual seat part of the seat cover 2.

Figure 2:
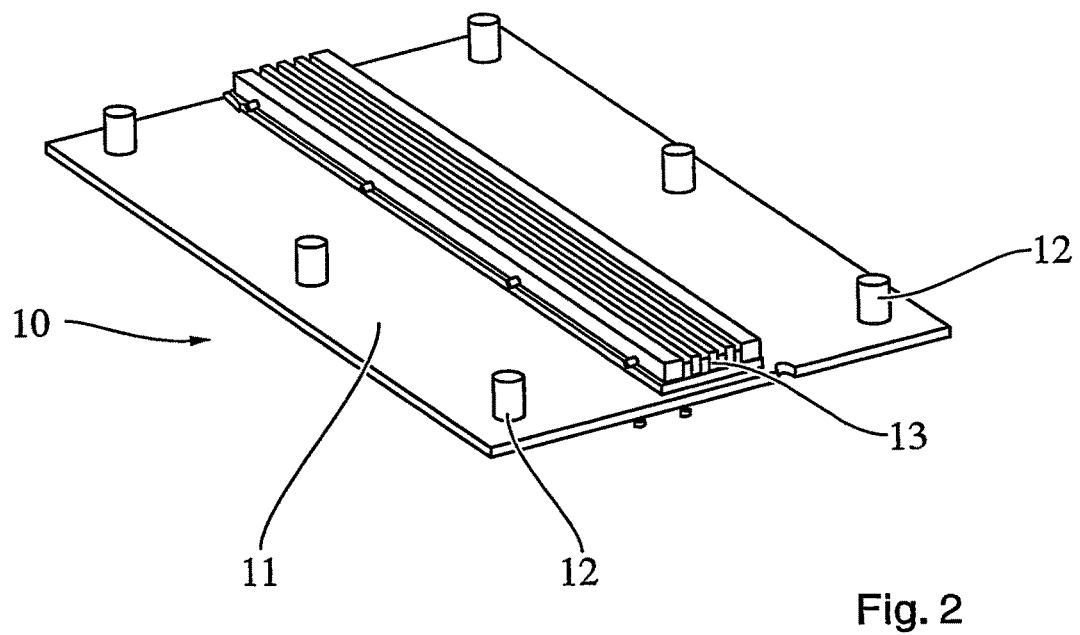
FIG. 2 is a perspective view of the first tool half.
Figure 3:
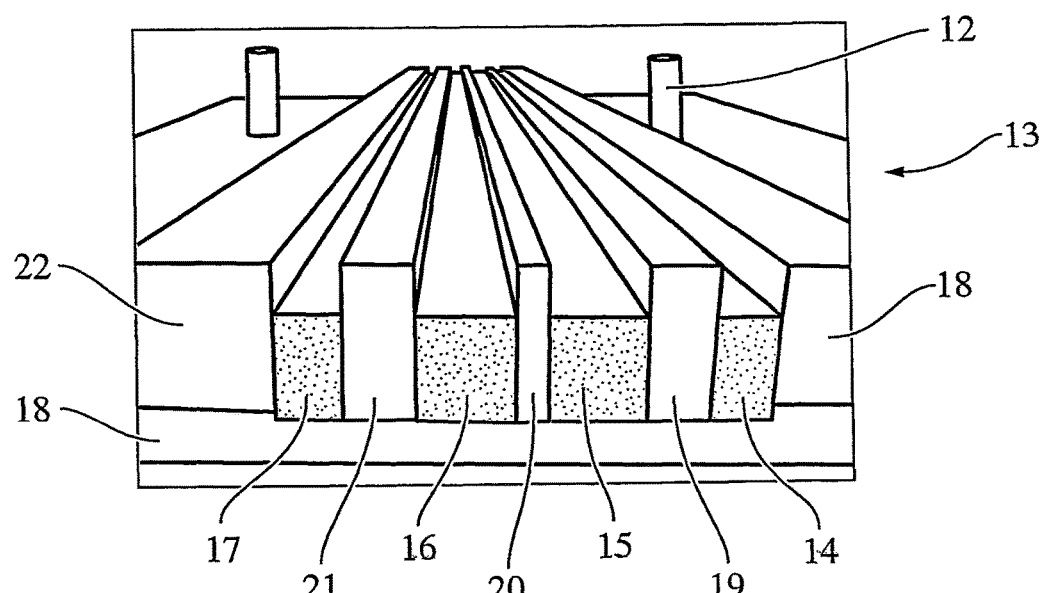
FIG. 3 is a perspective view of the electrodes and insulators on the first tool half.
Figure 4:
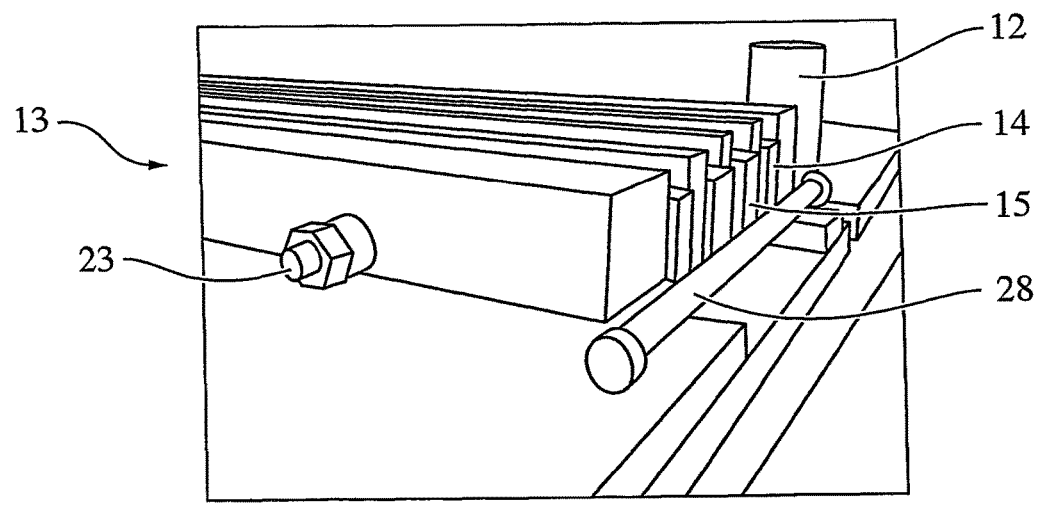
FIG. 4 is another perspective view of the electrodes and insulators on the first tool half.

FIG. 2 illustrates a first tool half 10, by means of which the decorative strips 3 to 6, which are illustrated in FIG. 1, are positioned on the seat cover 2 and are applied there by means of high-frequency welding. The first tool half 10 has a base plate 11 as well as a total of six spacers 12, which serve for an accurate distance positioning relative to a second tool half, which is to be applied. Provision is made between the spacers 12 for an electrode and insulator area 13. The latter extends on the base plate 11 and serves to accommodate and position the decorative strips 3 to 6. The electrode and insulator area 13 will be explained in more detail below with reference to FIGS. 3 and 4. A total of four rod-like metallic electrodes are present. They are identified with 14, 15, 16 and 17. The electrodes 14 to 17 are electrically conductive and are contacted by an electric connecting rod 18, via which a high-frequency field is applied to the electrodes 14 to 17. The width and orientation and arrangement of the electrodes 14 to 17 corresponds to the width and positioning of the decorative strips 3 to 6, which are to be applied. The electrodes 14 to 17 are separated from each other by means of insulators 18 and 22, which form the outer limitation, while the insulators 19, 20 and 21 separate the electrodes 14 to 17 from each other. The insulators 18 to 22 are embodied in a rod-like manner and protrude beyond the electrodes 14 to 17. This results in rail-like insertion areas for the decorative strips 3 to 6, which are to be accommodated, directly on the electrodes 14 to 17. The insulators 18 to 22 are embodied so as to be slightly shorter than the electrodes 14 to 17, so that they protrude beyond the front side and can come into direct contact with the contact rod 28. As can in particular be seen in FIG. 4, electrodes and insulators are connected to each other by means of a screw connection 23. The latter can be released and different combinations and sequences of decorative strips can be established in a simple manner, in that the number of electrodes is changed or in that electrodes comprising other widths or insulators comprising other widths are used.

Figure 5:
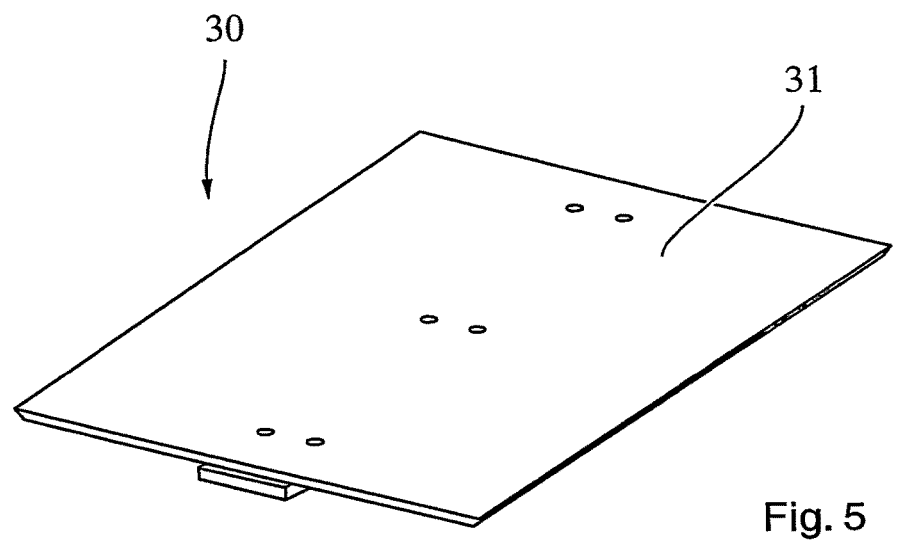
FIG. 5 is a perspective view of the upper side of the second tool half.
Figure 6:
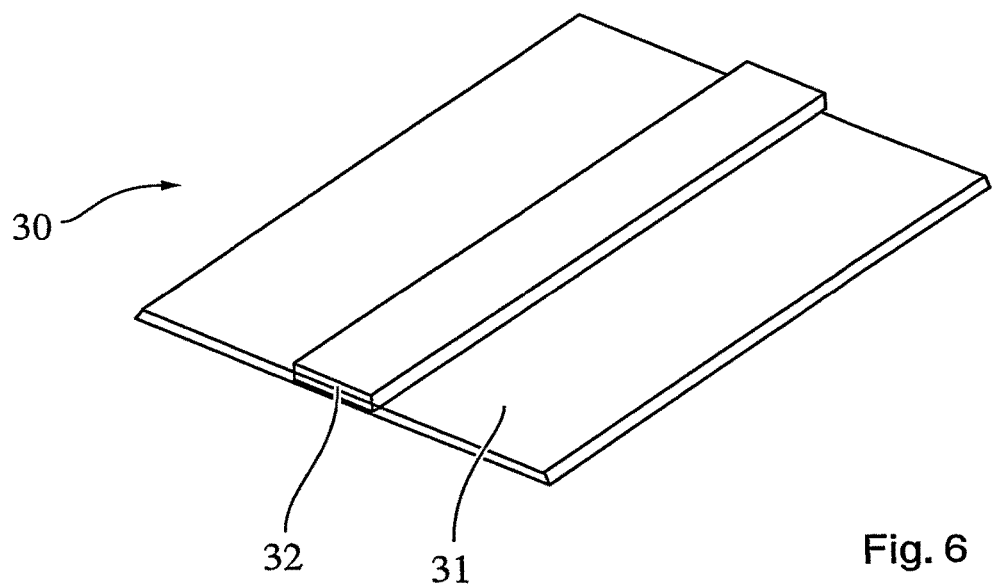
FIG. 6 is a bottom side view of the second tool half.

FIG. 5 illustrates the top view of the second tool half 30, which substantially consists of a plate 31. The bottom view of the second tool half 30 is illustrated in FIG. 6. It has an additional plate-like elevated area 32, the size and dimension of which corresponds to the electrode and insulator area 13 on the first tool half 10.

Figure 7:
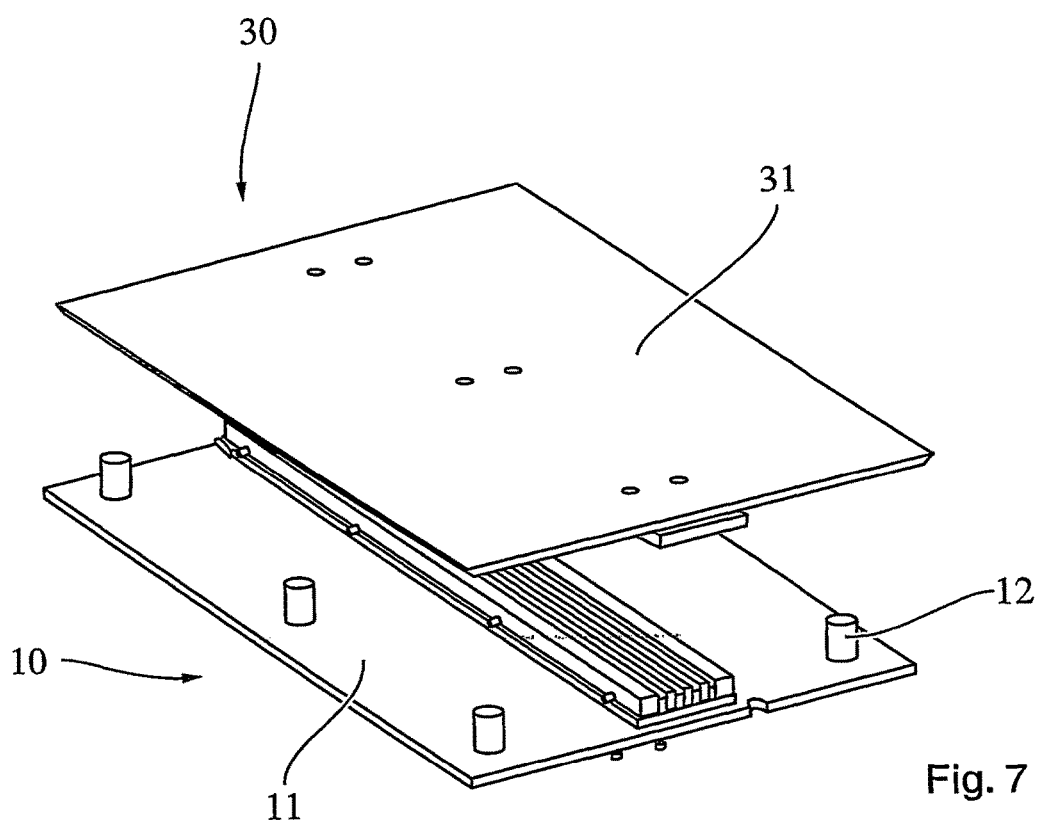
FIG. 7 is a perspective view of the first tool half and the second tool half in position relative to each other.

The two tool halves 10 and 30 are illustrated in FIG. 7 in relation to each other. The fabric or seat cover is inserted between the tool halves 10, 30 and the decorative strips 3 to 6, which are placed onto the electrodes 14 to 17, are then applied to the seat cover 2 arranged thereabove by means of high-frequency welding. A high-frequency generator typically comprising 15 to 30 kW is used for this purpose. The tool halves 10 and 30 are pressed against each other with the help of hydraulic presses. The upper tool half 30 is thereby typically fastened, while the lower tool half 10 is pressed against the upper tool half 30.

With reference to the method, the decorative strips 3 to 6 are placed onto the electrodes 14 to 17, which are oriented parallel to each other, so that they are located between the parallel insulators 18 to 22 and are oriented in a straight and parallel manner at that location. A seat cover 2 is then placed onto the first tool half 10 comprising the decorative strips 3 to 6, which rest on the electrodes 14 to 17. The second tool half 30 is then placed onto the seat cover 2. A high-frequency voltage is applied to the electrodes 14 to 17, wherein this can take place via the contact rod 28. The decorative strips 3 to 6 are welded to the seat cover 2 by means of the high-frequency alternating voltage between the electrodes 14 to 17 and the second tool half 30. The first tool half 10 is simultaneously pressed against the second tool half 30 by means of a hydraulic press, which exerts a compressive force of approximately 15 to 20 kilonewtons. Preferably, the hydraulic press exerts a pressure between a lower plate, which moves upwards, and a fixed upper plate. The first tool half 10 is preferably the lower plate, which is pressed upwards.

The process flow can be described in detail by means of FIGS. 8 to 11 in such a manner that the hydraulic press initially does not exert the full pressure, but that only the second tool half 30, in particular the surface area 32 of the second tool half 30, which is elevated in a plate-like manner, is initially in contact with the first tool half 10, in particular with the insulators 18 to 22 at that location. The surface area 32, which is elevated in a plate-like manner, is prestressed relative to the plate 31 by means of pressure springs 33. In response to an increasing pressure between the first tool half 10 and the second tool half 30, the insulators 18 to 22 are then lowered to the extent that they form a plane with the electrodes 14 to 17. The decorative strips 3 to 6 comprising the seat cover 2, which is placed thereabove, then rest against the second tool half 30 at this point in time. The high-frequency field can be applied in particular at this position and the decorative strips 3 to 6 can be welded to the seat cover 2. In response to a further increase of the pressure between the first tool half 10 and the second tool half 30, the surface area 32, which is elevated in a plate-like manner, is pressed increasingly against the plate 30, until the latter abuts completely at that location and the minimum distance between the two tool halves 10, 30 is reached, which is predetermined by spacers 12. Preferably, the insulators 18 to 22 are lowered even further in parallel, until the electrodes 14 to 17 comprising the seat cover 2 resting thereon, protrude beyond the insulators 14 to 17 with the welded-on decorative strips 3 to 6. The pressure springs 33 are further pressed together parallel thereto. When the tool halves 10 and 30 are in their end position, which is predetermined by means of the spacers 12, and when the maximum pressure is exerted, the pressure springs 33 are compressed as far as possible.

While specific embodiments of the invention have been shown and described in detail to illustrate the application of the principles of the invention, it will be understood that the invention may be embodied otherwise without departing from such principles.

The invention claimed is:

1. A method for applying at least one decorative strip to a seat cover by means of high-frequency welding, the method comprising the steps of:
    placing decorative strips into a first tool half comprising electrodes, which are oriented parallel to each other, and insulators, which separate the electrodes and which are oriented in parallel;
    placing a seat cover onto the first tool half comprising the decorative strips, which are inserted parallel to each other,
    placing a second tool half onto the seat cover;
    applying a high-frequency alternating voltage between the electrodes of the first tool half and the second tool half, so that the decorative strips are welded to the seat cover;
    pressing the first tool half and the second tool half against each other by means of an applied pressure during the high-frequency welding; and
    pushing the insulators, which protrude beyond the electrodes at the beginning of the process, downwards when being compressed, so that a height difference between the insulators and the electrodes becomes smaller.

2. The method according to claim 1, wherein the insulators are height-adjustable relative to the electrodes and are shifted during the step of pushing such that the insulators and the electrodes form a plane on the upper side thereof at the end of the step of pushing.

3. The method according to claim 1, wherein the insulators are height-adjustable relative to the electrodes and are shifted in such a manner during the step of pushing such that the upper sides of the insulators are lower than the electrodes at the end of the step of pushing.

4. A device for applying at least one decorative strip to a seat cover by means of high-frequency welding, the device comprising two tool halves, least one of which has an electrode, comprising a first tool half comprising at least two electrodes, which are oriented parallel to each other and have widths adapted to a width of the decorative strips, which are to be applied, and insulators, which are oriented in parallel, arranged between the electrodes and parallel on the outsides of the electrodes wherein:
    the insulators protrude beyond the electrodes in the direction of the second tool half; and
    the insulators are height-adjustable relative to the electrodes.

5. The device according to claim 4, wherein the second tool half has an elevated surface area, which corresponds to an area formed by the electrodes and the insulators on the first tool half.

6. The device according to claim 5, wherein the elevated surface area of the second tool half is movably arranged on the second tool half.

7. The device according to claim 4, wherein the insulators can be shifted from the position, which protrudes beyond the electrodes in the direction of the second tool half, into a position, in which the insulators and the electrodes form a common plane.

8. The device according to claim 4, wherein two middle electrodes are wider than two outer electrodes.

9. The device according to claim 4, wherein a distance between two middle electrodes is smaller than a distance between one of the middle electrodes and an outer electrode.

10. The device according to claim 4, wherein the electrodes are embodied as electrode rods.

11. The device according to claim 4, wherein the electrodes are conductively connected to each other.

12. The device according to claim 4, wherein the insulators are embodied as insulator rods.

13. The device according to claim 4, wherein that the insulators and the electrodes are releasably connected to each other.

* * * * *